W. L. L. PELTZ.
CUSHIONED SUSPENSION FOR VEHICLES.
APPLICATION FILED JUNE 29, 1912.
1,084,819.
Patented Jan. 20, 1914.
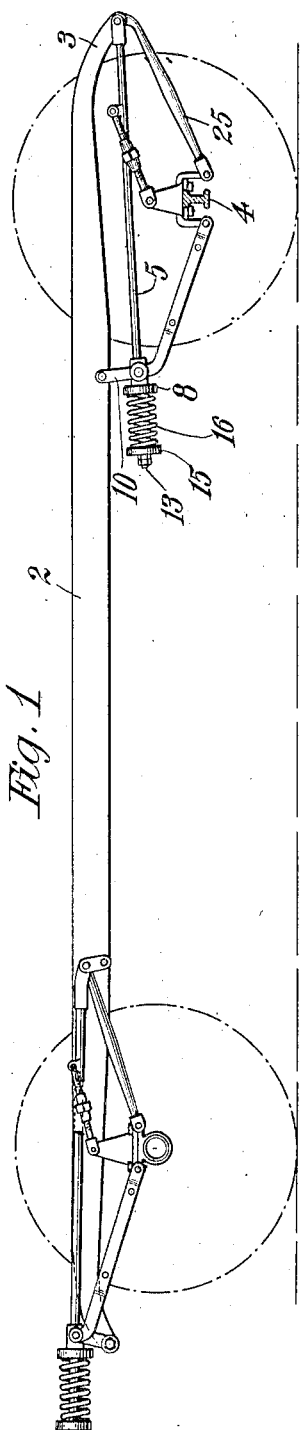
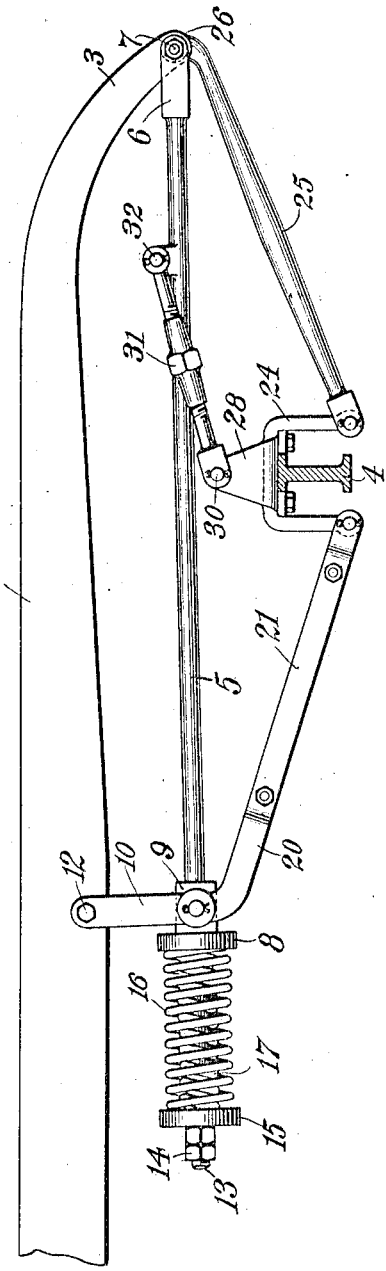
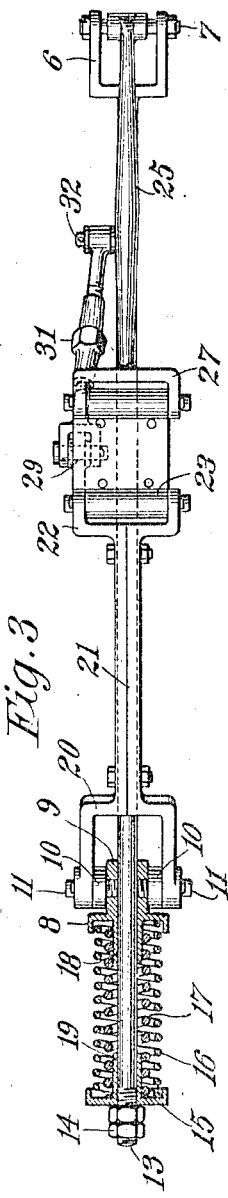
Witnesses:
Raphaël Netter
G. S. Hansen
William L. L. Peltz  Inventor
By his Attorney
Alan S. Mann

UNITED STATES PATENT OFFICE.

WILLIAM L. L. PELTZ, OF SELKIRK, NEW YORK.

CUSHIONED SUSPENSION FOR VEHICLES.

1,084,819. Specification of Letters Patent. Patented Jan. 20, 1914.

Continuation of application Serial No. 616,072, filed May 22, 1911. This application filed June 29, 1912. Serial No. 706,559.

*To all whom it may concern:*

Be it known that I, WILLIAM L. L. PELTZ, a citizen of the United States, and a resident of Selkirk, county of Albany, State of New York, have invented a new and Improved Cushioned Suspension for Vehicles, of which the following is a full, clear, and exact description, reference being had to the accompanying drawing, in which—

Figure 1 is a side elevation of the vehicle frame, or chassis, showing embodiments of my invention as attached to the front and rear thereof; Fig. 2 is a detailed elevation of the front suspension shown in Fig. 1; and Fig. 3 is a plan view showing the underside of the front suspension.

This invention relates to a suspension for vehicle bodies, being particularly adapted for use on motor vehicles, and provides simple means for taking up the force of jolts without using laminated or leaf springs.

In springs of the ordinary type, pressure between the axle and the body is direct and practically vertical. When the pressure of the axle is increased by a jolt against the ground wheels, the spring is at once compressed and much of the direct force of the jolt is temporarily absorbed. But the pressure on the spring must also be relieved, and as the leaf spring transmits the force in the same line in which it was received, there is a decided recoil, or secondary action upward against the body of the vehicle. It is largely because of this secondary action that there is now a demand for shock absorbers, the use of which plainly shows that a leaf spring is not an ideal suspension device.

In my invention, the pressure between the axle and the body is not transmitted directly through a spring, but is first resolved into two components, each of which is composed of horizontal and vertical elements, with the horizontal elements the greater. Spring means is used to cushion the horizontal elements and since the horizontal elements are the greater, the arms by which the pressure is resolved into its components act with the force of a toggle to compress the spring, so that it readily yields to any increase of pressure on the axle. For the same reason the secondary or recoil force of the spring will act against the leverage of the toggle so that the recoil will be so slow as to be scarcely noticeable.

To accomplish this result is the primary object of my invention, but, at the same time, I aim to supply a cushioning means for vehicles that may be readily adjustable to a varying load and one that may be easily lubricated.

The way in which I carry out my invention can best be explained by reference to the accompanying drawings. These show two slightly different forms of the device, one of which is adapted to be used on the front end of an automobile, and the other on the rear end. The two forms of construction are, however, so similar that from an explanation of one form a skilled mechanic can easily work out the variations which may be necessary to apply my invention to vehicles of various designs, and to the various points in a single vehicle where it may be necessary to attach the device. I shall therefore describe my invention particularly as embodied in the front suspension shown, but it is to be understood that I do not limit myself to the details of construction herein described.

In the preferred embodiment disclosed, I have shown a vehicle frame member 2 of the common beam channel construction, the ends of which are bent downwardly to form the customary construction of horn 3, and beneath which is disposed any preferred form of axle 4. To the axle is mounted a ground wheel of the usual type. As shown in Fig. 2, there is pivoted to the horn 3 a tension rod 5, the forward end of which is formed into a yoke 6 attached to the end of the horn 3 by means of a pin 7. This tension rod 5 extends beneath, substantially parallel with, and spaced a short distance from the frame member 2. Slidably mounted upon the tension rod 5 and adjacent to and spaced some distance from its free end, is a spring seat cap 8, having an integral sleeve 9 extending a short distance forwardly therefrom. This sleeve is substantially square in cross-section to afford a bearing surface for the links 10, and has extending from opposite sides thereof bearings 11 which may either be made to screw into the sleeve or be made integral therewith. Upon each of these bearings is pivotally mounted one of a pair of parallel links 10, the upper ends of which links straddle the vehicle member 2 and are pivotally connected thereto by means of a pin 12. As shown in Fig. 1, the links 10 are inclined downwardly and slightly toward the axle 4, so as to permit a movement to the rear by said links without causing the same to move to a dead center. The end 13 of the tension rod 5 is threaded and carries jam nuts 14 bearing against a spring seat cap 15. Disposed between the spring seat caps 8 and 15 is a relatively light cylindrical compression spring 16 concentric with the axis of the tension rod 5 and bearing against each of said seat caps. Disposed within this spring 16, and also concentric with the tension rod 5, is a relatively heavier spring 17. This inner spring lies idle between the two caps and is held loosely in position by means of bosses 18 and 19, which extend toward each other from the caps 8 and 15. It will be seen that relative movement between the two caps will first be taken up by the lighter spring 16 and, after this spring has been compressed a predetermined distance fixed by the nuts 14, the heavier spring 17 will be brought into play to reinforce and augment the lighter spring. In place of coil springs many other forms of spring means, as, for example, an air cushion, may be utilized.

Pivotally mounted upon the bearings 11, and straddling the lower ends of the links 10, is a square yoke 20, forming the upper end of the compression arm 21 which extends downwardly and toward the horn 3 and makes an acute angle with the tension rod 5. As shown in Fig. 3, this arm is preferably made in two bolted together segments in order to simplify assembling. The lower end of this arm is formed into a yoke 22, which straddles and is pivoted to the rolled end 23 of the inverted U shaped yoke 24. This yoke in turn straddles and is rigidly mounted on the axle 4 below the rod 5. The compression arm 21 constitutes one of the legs of the triangle shaped suspension, the other leg of which is formed by a compression arm 25, which has its upper end journaled to the pin 7 between the bifurcated end 26 of the horn 3, and which extends downwardly and toward the rear, terminating in a yoke 27, similar to the yoke 22. This compression arm is pivoted to the forward face of the yoke 24 in a similar manner to that described in connection with the pivoting of the arm 21 with said yoke. In order to maintain this triangular suspension in its vertical plane, and, at the same time, admit of a relative movement between the several parts, I provide a stabilizing device in the form of a connection between the tension rod 5 and yoke 24. One end of the flat upper portion of said yoke 24 between the vertically disposed depending faces has extending upwardly therefrom and integral therewith a vertically disposed bracket 28 apertured at 29 to form a bearing for a pin 30. Mounted on the said pin is one end of a turn-buckle 31. The other end of this turn buckle is pivoted to the tension rod 5 by the pin 32.

In the operation, it will be seen that any jolt on the wheels of the vehicle will be transmitted to the axle thereof, as in the common form of vehicle; but instead of the force of the shock being transmitted upward to the body of the vehicle, it will be resolved into two lateral components extending along the arms 21 and 25. As the rods 21 and 25 meet at an angle greater than 90°, the effect of the force exerted on the axle is to spread apart their upper ends with considerable leverage in the familiar manner of a toggle joint, and inasmuch as the rod 25 is pivoted directly to the frame member 2, all of the motion from this toggle will be transmitted along the tension rod 5 and against the springs 16 and 17. Owing to the leverage described above, these springs will readily compress under the force of the jolt. But when the jolt has ceased, and the springs seek to reëxpand to their normal position, they will be acting against the leverage of the toggle and will therefore expand comparatively slowly. In other words, this device changes a short jolt into a slow, upward lift on the body of the vehicle, which will be almost imperceptible. It will also be seen that by this construction there is very little upward stress tending to distort the horn 3, as is common with the laminated spring suspension, for almost all of the strain on this device will be taken up by the tension rod 5.

As shown to the left of Fig. 1, I have illustrated a form of suspension adapted for use in connection with the rear wheels of automobiles, but the changes necessary for this construction are so simple that they do not need to be described.

It is to be understood that my device can be broadly modified in order to accommodate my new and improved suspension to varying conditions, the essential elements being similar to those previously described in detail in the preferred embodiment.

This case is a continuation of my application, Serial No. 616,072, filed March 22, 1911.

Having thus described my invention, I claim as new and desire to secure by Letters Patent:

1. In connection with a vehicle body frame, an axle, two compression members connected with said axle, a tension rod directly attached to said frame and pivotally connected with said compression members, the connection with one of said compression members being such that said tension rod may move endwise in relation to said compression member, and means associated with the tension rod to take up a portion of the force of shocks exerted on the axle and transmitted by said compression members.

2. In connection with a vehicle body frame, an axle, two compression members connected with said axle, a tension rod attached to said frame by members short in relation to said compression members, and connected with said compression members, the connection with one of said compression members being such that said tension rod may move endwise in relation to said compression member, and means associated with the tension rod to take up a portion of the force of shocks exerted on the axle and transmitted by said compression members.

3. In connection with a vehicle body frame, an axle, two compression members pivotally connected with said axle, a tension rod connected to said frame and said compression members, the connection with one of said compression members being such that said tension rod may move endwise in relation to said compression member, means associated with the tension rod to take up a portion of the force of shocks exerted on the axle and transmitted by said compression members, and means to prevent undesirable turning of said axle in relation to said compression members.

4. In connection with a vehicle body frame, an axle, two compression members pivotally connected with said axle, a tension rod connected to said frame and said compression members, the connection with one of said compression members being such that said tension rod may move endwise in relation to said compression member, means associated with the tension rod to take up a portion of the force of shocks exerted on the axle and transmitted by said compression members, and a guide rod pivotally connected to said axle and said tension rod.

5. In connection with a vehicle body frame, an axle, two compression members each pivotally connected at one end with the axle and extending at an angle with each other toward the frame, means for connecting the other ends of the compression members with the frame, at least one of said compression members being attached to the frame through a link short in relation to said compression member, and means connecting the upper ends of said compression members to take up a portion of the force of shocks exerted on the axle and transmitted by said compression members.

6. In connection with a vehicle body frame, an axle, two compression members pivotally connected at one end with the axle and extending at an angle with each other toward the frame, means for connecting the other ends of the compression members with the frame, at least one of said compression members being pivoted at a point immovable in relation to said frame, and means connecting the upper ends of said compression members to take up a portion of the force of shocks exerted on the axle and transmitted by said compression members.

7. In connection with a vehicle body frame, an axle, two compression members each pivotally connected at one end with the axle and extending at an angle with each other toward the frame, means for connecting the other ends of the compression members with the frame, means connecting said compression members to take up a portion of the force of shocks exerted on the axle and transmitted by said compression members, and means to prevent undesirable turning of said axle in relation to said compression members.

WILLIAM L. L. PELTZ.

Witnesses:
G. S. HANSEN,
L. BATES.